Jan. 1, 1957     G. VISCHULIS, JR     2,775,900
WINDSHIELD WIPER DRIVE AND PARKING MECHANISM
Filed March 17, 1954
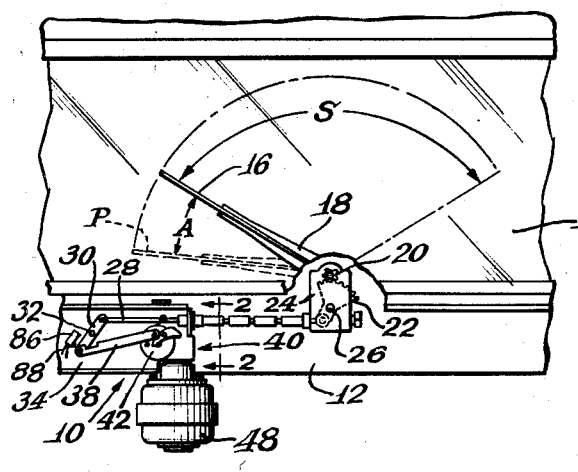
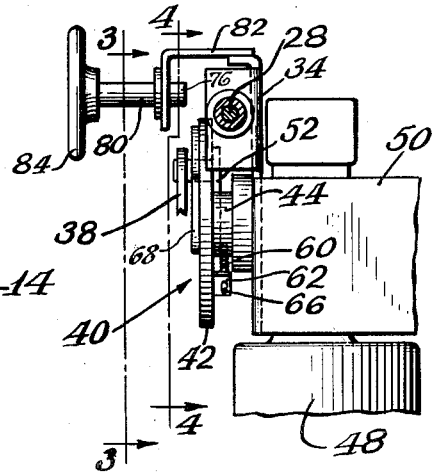
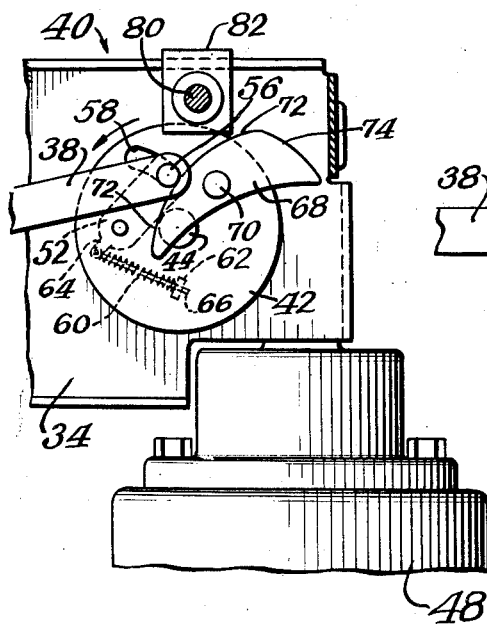
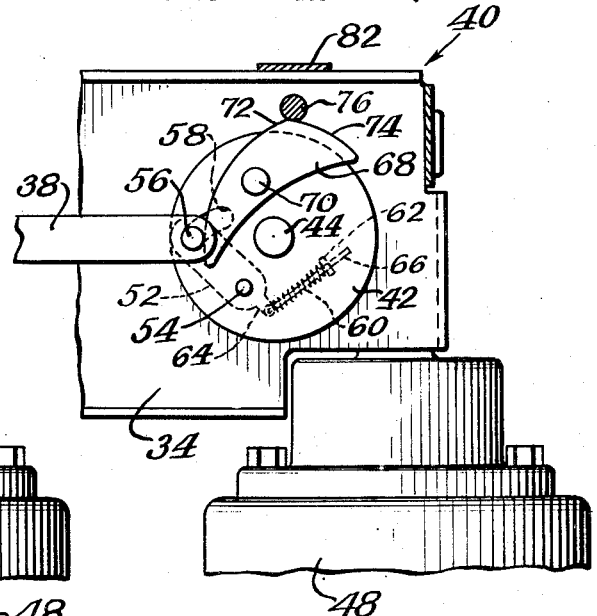
Inventor:
George Vischulis, Jr.
By Ahlberg, Hupper & Gradolph
Attorneys.

United States Patent Office 2,775,900
Patented Jan. 1, 1957

2,775,900

WINDSHIELD WIPER DRIVE AND PARKING MECHANISM

George Vischulis, Jr., Noridge, Ill., assignor to Stewart-Warner Corporation, Chicago, Ill., a corporation of Virginia Application March 17, 1954, Serial No. 416,802

3 Claims. (Cl. 74—70)

The present invention relates to an improved drive and parking mechanism for oscillatory windshield wipers.

One object of the invention is to provide for an oscillatory windshield wiper an improved wiper drive of simple, economical construction, which operates positively to move the wiper blade beyond its normal stroke to a parking position upon actuation of a control to stop the wiper.

A further object is to provide a windshield wiper drive of the character recited in the previous object in which a uniform length of the normal stroke of the attached wiper blade is assured by a highly effective application of a return spring without diminishing the effectiveness with which the blade is positively moved beyond its normal stroke to a parking position.

Other objects and advantages will become apparent from the following description of the form of the invention shown in the drawing, in which:

Figure 1 is a fragmentary elevational view of a windshield wiper drive incorporating the invention, certain parts being broken away for clearness in illustration;

Fig. 2 is a vertical sectional view on an enlarged scale taken along the line 2—2 of Fig. 1;

Fig. 3 is a fragmentary vertical view taken along the line 3—3 of Fig. 2 and showing the drive conditioned for operating the wiper blade through a normal stroke; and Fig. 4 is a fragmentary view taken along the line 4—4 of Fig. 2 and showing components of the drive after operation to park the wiper blade.

For convenience in illustration, the present invention is incorporated into the windshield wiper organization of applicant's prior Patent No. 2,491,697, issued December 20, 1949. As shown, an improved windshield wiper drive and parking mechanism 10 is mounted on support structure 12 underlying a windshield 14 to oscillate a wiper blade 16 across the windshield. Although the drive 10 is capable of operating two or more wiper blades, the illustration of only one wiper in the drawing is sufficient for an understanding of the invention.

The wiper blade 16 is attached to a swingable arm 18 supported in a conventional mount (not specifically illustrated) at the lower edge of the windshield 14 and operated by a pinion 20 meshing with gear teeth on the upper end of a sector gear 22. The sector gear 22 is pivoted within a small housing 24 on the support structure 12 by a pivot pin 26 extending through the medial portion of the gear. The lower end of the sector gear 22 is connected with a horizontal actuator 28 pivoted to the upper end of a rock lever 30. The lever 30 is centrally pivoted on a pin 32 extending forwardly from a rail 34 forming a part of the support structure 12. The lower end of the lever 30 is connected by a link 38 to an improved wiper drive and parking mechanism 40 provided by the present invention.

As shown, the drive and parking mechanism 40 comprises a disc 42 fixed to the outer end of a drive shaft 44 extending horizontally through the support rail 34. The shaft 44 may be rotated by any suitable drive. For the purpose of illustration, however, it is driven by an electric motor 48 through conventional gearing 50 on the back side of the rail 34.

A lever 52 having a length somewhat less than the diameter of the disc 42 is swingably mounted on the disc by a pivot 54 radially spaced from the support shaft 44. From the pivot 54 the main portion of the lever 52 extends diagonally across the disc 42 to one side of the shaft 44 in a direction opposite the direction of rotation of the disc. (The disc 42 is rotated in the counterclockwise direction as viewed in Figs. 3 and 4.)

The free end of the lever 52 is pivotally connected to the wiper actuating link 38 by a pin 56 extending through an arcuate slot 58 in the disc 42. The slot 58 has a center of curvature coinciding with the pivot 54, and serves to limit the extent of movement of the arm 52 relative to disc 42.

The lever 52 is urged toward the shaft 44 by a compression coil spring 60 acting between an abutment 62 on the disc 42 and a projection 64 on the end of the lever 52 opposite the pin 56. An elongated spring support 66, extending through the spring 60, is slidably mounted in the abutment 62 and is pivotally secured to the projection 64.

During normal operation of the drive 40 the action of the spring 60 on the lever 52 seats the connecting pin 56 in the inner end of the slot 58 for rotation by the disc 42. Moreover, the reaction from the wiper oscillating linkage on the driving pin 56 tends to hold the pin in the inner end of the slot 58, which trails the outer end of the slot with respect to the direction of rotation of the disc 42.

The effective radius arm of the pin 56 about the rotary axis of the driving disc 42 determines the stroke of the wiper oscillating linkage connected to the pin. When the pin 56 is in the inner end of the slot 58, the wiper blade 16 is oscillated through its normal stroke, indicated by the arc S in Fig. 1.

The wiper blade 16 is parked in an out-of-the-way position P, Fig. 1, by moving the blade an additional angular distance (indicated by the arc A in Fig. 1) beyond one extreme end of the normal stroke S of the blade. This is accomplished by structure which positively shifts the pin 56 away from the inner end of the disc slot 58 against the force of the spring 60 and the reaction of the wiper to increase the effective radius arm of the pin as the wiper blade 16 approaches the extreme end of its normal stroke next to the blade parking position P. The increase in the effective radius arm of the pin 56 extends the movement of the wiper oscillating linkage sufficiently to carry the blade to its parking position.

The structure used to positively shift the driving pin 56 away from the inner end of the slot 58 comprises an elongated shifting member 68 centrally pivoted on the outer face of the disc 42 by a pivot pin 70 on the disc. The pin 70 is spaced circumferentially from the inner end of the slot 58 in trailing relation to the slot with respect to the direction of rotation of the disc. The elongated edge of the shifting member 68 adjacent the slot 58 is shaped to form a somewhat convex cam surface 72 adapted to engage a portion of the pin 56 projecting through the slot 58. The outer end of the shifting member 68 extends somewhat beyond the peripheral edge of the driving disc 42 and forms a convex cam surface 74 having a progressively increasing radius with respect to the pivot 70 from the leading to the trailing edge of the member.

The cam surface 74 is adapted to engage a movable abutment 76 formed by the inner end of a horizontal plunger 80. The plunger 80 is slidably mounted in the depending leg of an L-shaped bracket 82 fixed to the upper edge of the support rail 34. A manual control knob 84 is attached to the outer end of the plunger 80.

A motor control switch 86 is mounted on the support rail 34 to be opened by the extended movement of the rock lever 30 as the wiper blade 16 reaches its parked position P. The switch 86 is connected by leads 88 to the electrical energizing circuit (not shown) for the driving motor 48.

A review of the operation of the improved windshield wiper operating mechanism thus provided may start with the assumption that the plunger 80 has been shifted outwardly by pulling on the manual control knob 84 to put the wiper into operation. This movement of the plunger 80 pulls the abutment 76 clear of the shifting member 68. The spring 60 swings the lever 52 about the pivot 54 to seat the driving pin 56 in the inner end of the slot 58 and retract the rock link 30 from its extended position, allowing the switch 86 to start the driving motor 48. The driving disc 42 rotates in the counterclockwise direction as viewed in Figs. 3 and 4 to oscillate the wiper blade 16 through its normal stroke S.

To stop the wiper, the plunger 80 is shifted inwardly by the knob 84 to move the abutment 76 into the rotary path of the shifting member cam surface 74. Rotation of the driving disc 42 continues in the same direction to engage the cam surface 74 with the abutment 76. The shifting member 68 is swung about its pivotal support pin 70 to positively force the driving pin 56 to the outer end of the slot 58. This increases the effective radius arm of the drive pin 56 about the driving disc axis to move the wiper blade 16 to its parking position P. The extended movement of the rock lever 30 operates the switch 86 to stop the motor 48.

It will be appreciated that proper parking of the wiper blade 16 is assured by the positive action with which the simplified parking mechanism forces the driving pin 56 away from the rotary axis of the driving disc 42. Since this parking action is positive in character, the return spring 60 may be designed with sufficient strength to assure proper seating of the pin 56 in the inner end of the slot 58 and hence a uniform wiper blade stroke during normal operation of the wiper.

While I have shown and described a preferred embodiment of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. In a windshield wiper drive, the combination of a rotary driving member, a lever swingably mounted on the driving member so that the outer end of the lever is movable toward and away from the rotary axis of the driving member, a wiper blade operating linkage connected to the outer end of the lever, biasing means mounted to urge the outer end of the lever toward the driving member axis to a normal operating position, means for limiting swinging movement of the lever on the driving member, a shifting member pivotally mounted on the driving member for engagement with structure carried by the lever, and a shiftable control member movable into the path of the shifting member for operating the latter to shift the end of the lever connected with the operating linkage outwardly from the driving member axis upon continued movement of the driving member in the same direction to extend the operating linkage beyond its normal stroke to a parking position.

2. In a windshield wiper drive, the combination of a rotary driving member, a lever swingably mounted on the driving member so that the outer end of the lever is movable toward and away from the rotary axis of the driving member, means for limiting swinging movement of the lever on the driving member, the orientation of the lever on the driving member being such that the outer end of the lever in moving radially outward from the axis of driving member is swung a substantial distance circumferentially on the driving member in the direction of rotary movement thereof, a wiper blade operating linkage connected to the outer end of the lever, biasing means mounted to urge the outer end of the lever toward the driving member axis to a normal operating position, a shifting member, means pivotally supporting the shifting member for normal rotation with the driving member, a shiftable control member movable into the path of rotary movement of the shifting member incident to rotation of the driving member, said control member upon engagement thereof by said shifting member serving to cause rotation of the latter with respect to the driving member as an incident to continued rotation of the latter in the same direction, and said shifting member including means thereon engageable with structure carried by the lever to shift the end of the lever connected with the operating linkage outwardly from the driving member axis to extend the operating linkage beyond its normal stroke to a parking position as an incident to the last mentioned rotation of the shifting member with respect to the driving member produced by continued rotation of the driving member after engagement of the shifting member with the control member.

3. In a windshield wiper drive, the combination of a rotary driving member, shiftable means mounted movably on the driving member, means on the driving member coacting with the shiftable means and defining a predetermined path of limited movement for the latter on the driving member, the path of movement of the shiftable means on the driving member having a leading end and a trailing end, said leading end of the path of movement being disposed radially outward of the trailing end with respect to the axis of the driving member and being located on the driving member circumferentially ahead of the trailing end with respect to the direction of rotation of the driving member, a wiper blade operating linkage connected with the shiftable means, spring means mounted to urge the shiftable means continuously toward the trailing end of the path of movement thereof to a normal operating position on the driving member, a shifting member pivotally mounted on the driving member for engagement with the shiftable means as an incident to turning movement of the shifting member relative to the driving member in a direction opposite to the normal direction of rotation of the latter, the shifting member being shaped to move said shiftable means toward the leading end of said path of movement thereof upon turning of the shifting member in said opposite direction on the driving member, the shifting member normally being free of rotation with the driving member during operation of the drive, and a shiftable control member movable into the path of the shifting member for engagement with the latter to cause rotation thereof in said opposite direction relative to said driving member as an incident to continued rotation of the latter to shift the shiftable means toward said leading end of the path of movement thereof on the driving member to extend the wiper blade operating linkage beyond its normal stroke to a parking position.

References Cited in the file of this patent

UNITED STATES PATENTS 2,452,496     Schneider _____ Oct. 26, 1948

FOREIGN PATENTS 873,802     Germany _____ Apr. 16, 1953